United States Patent
Andrigo et al.

(10) Patent No.: US 6,405,987 B1
(45) Date of Patent: Jun. 18, 2002

(54) REINFORCEMENT MEMBER FOR A SEAT MOUNTING ASSEMBLY

(75) Inventors: Gregory James Alexander Andrigo, Orillia; Gregory David Collins, Gravenhurst; Hugh D. Downey, Barrie; Richard Allen Lagerweij, Thornton, all of (CA)

(73) Assignee: Dura Global Technologies, Inc., Rochester Hills, MI (US)

(*) Notice: Subject to any disclaimer, the term of this patent is extended or adjusted under 35 U.S.C. 154(b) by 0 days.

(21) Appl. No.: 09/368,956

(22) Filed: Aug. 5, 1999

(51) Int. Cl.$^7$ ............................................. F16M 13/00
(52) U.S. Cl. ................................................. 248/429
(58) Field of Search ............................... 248/424, 429, 248/430; 297/216.19, 452.18

(56) References Cited

U.S. PATENT DOCUMENTS

| | | | |
|---|---|---|---|
| 4,556,186 A | 12/1985 | Langmesser, Jr. et al. .. | 248/429 |
| 4,597,552 A | * 7/1986 | Nishino ....................... | 248/429 |
| 4,781,353 A | 11/1988 | Nishino ....................... | 248/395 |
| 5,292,164 A | 3/1994 | Rees ........................... | 296/65.1 |
| 5,306,073 A | 4/1994 | Rees ........................... | 297/362.14 |
| 5,322,348 A | 6/1994 | Johnson et al. ............. | 297/473 |
| 5,472,165 A | 12/1995 | Gruber ....................... | 248/424 |
| 5,483,853 A | 1/1996 | Moradell et al. ....... | 74/665.6 D |
| 5,507,552 A | 4/1996 | Ineich et al. ............. | 297/216.1 |
| 5,573,219 A | * 11/1996 | Chinomi ..................... | 248/421 |
| 5,664,755 A | 9/1997 | Gruber ....................... | 248/424 |
| 5,816,555 A | 10/1998 | Ito et al. .................... | 248/429 |
| 5,823,499 A | 10/1998 | Ito et al. .................... | 248/429 |
| 5,938,164 A | * 8/1999 | Kargol et al. .............. | 248/429 |
| 5,988,581 A | * 11/1999 | Freund et al. .............. | 248/429 |
| 6,007,039 A | * 12/1999 | Olsson et al. .............. | 248/424 |
| 6,021,990 A | * 2/2000 | Freund ....................... | 248/429 |
| 6,089,665 A | * 7/2000 | Andrigo .................. | 297/344.1 |
| 6,092,873 A | * 7/2000 | Downey et al. ......... | 297/344.1 |

* cited by examiner

Primary Examiner—Anita King
Assistant Examiner—Jon Szumny
(74) Attorney, Agent, or Firm—Porter, Wright, Morris & Arthur

(57) ABSTRACT

A vehicle seat assembly includes a seat back and a seat bottom and is attached to a vehicle support structure by a mounting assembly. The mounting assembly includes a first track and a second track supported for movement relative to the first track along a first longitudinal axis. The seat bottom is supported on the second track for axial movement with the second track. This allows the seat assembly to be adjusted forwardly or rearwardly by a seat occupant. The seat back can also be moved relative to the second track between an upright position and a recliner position. The seat assembly receives a seat load resulting from the seat occupant sitting in the seat with the seat back in the reclined position and/or from a forward movement of the seat occupant during a deceleration of the vehicle when the seat occupant is belted into the seat. The mounting assembly includes at least one bracket supported on the second track for movement therewith and a reinforcement member that is fixed to the bracket and defines a second longitudinal axis, which is parallel to said first longitudinal axis. The reinforcement member distributes the seat load applied to the bracket along the length of the second track.

16 Claims, 4 Drawing Sheets

REINFORCEMENT MEMBER FOR A SEAT MOUNTING ASSEMBLY

BACKGROUND OF THE INVENTION

This application relates generally to an assembly for mounting a seat within a vehicle. More particularly, this invention relates to a seat mounting assembly with a reinforcement member rigidly connected a seat track by at least one seat bracket where the reinforcement member receives seating loads via the bracket and distributes the loads along the length of the seat track.

Seat track arrangements for mounting seat assemblies within vehicles are generally well known. Most arrangements provide for a seat to be moved or adjusted in forward and rearward directions within a vehicle. Some arrangements also allow the seat to be positioned in a reclined position. Usually the seat assembly includes a seat back, a seat bottom, and a mounting assembly for mounting the seat assembly to a vehicle structure. The mounting assembly typically uses inboard and outboard seat track assemblies to adjust the seat forwardly or rearwardly within the vehicle.

Some seat assemblies also include a seat belt assembly that is supported solely by the seat assembly. A seat occupant who is belted into the seat assembly will exert a force on the seat assembly when the occupant experiences a deceleration load. This is known as an "all belts to seat" load. This seat load is transferred to the mounting assembly. Thus, the mounting assemblies must be strong enough to securely hold the seat assembly in place and prevent the seat tracks from buckling and/or prevent the seat from separating from the vehicle during a sudden deceleration.

Mounting assemblies that are used to mount the seat to the vehicle are often large, expensive, and complex, especially when the mounting assemblies include track strengthening components, such as risers and support brackets that are added to the mounting assembly in order to support an all belts to seat load. These complex mounting assemblies require a great number of components, which increases the assembly time, adds weight to the vehicle, and increases the overall cost of the seat assembly. Accordingly, it is desirable to provide a durable and robust seat mounting assembly that reduces the number of components and decreases the overall assembly cost, yet which is capable of supporting an all belts to seat load.

SUMMARY OF THE INVENTION

This invention relates to a vehicle seat assembly having a seat back and a seat bottom with the seat assembly being attached to the vehicle by a mounting assembly. The seat assembly preferably includes a seat belt assembly that is supported solely by the seat assembly. Thus, a seat occupant who is belted into the seat assembly will exert a force on the seat assembly when the occupant experiences a deceleration load. This is known as an "all belts to seat" load. This force or seat load that is exerted on the seat assembly is transferred to the mounting assembly.

In a preferred embodiment of this invention, the assembly for mounting a seat within a vehicle includes a first track defining a first longitudinal axis and a second track supported for movement relative to the first track along the first longitudinal axis. At least one bracket is supported on the second track for movement with the second track. A reinforcement member is fixed to the bracket and defines a second longitudinal axis that is parallel to the first longitudinal axis. The reinforcement member distributes the seat load applied via the bracket along the length of the second track.

The subject invention offers several advantages over prior art "all belts to seat" mounting assemblies because it provides a durable and robust mounting assembly that reduces the overall number of parts, reduces weight and overall assembly cost.

These and other features and advantages of the present invention will be best understood from the following specification and drawings, the following of which is a brief description.

DETAILED DESCRIPTION OF THE PREFERRED EMBODIMENT

Figure 1:
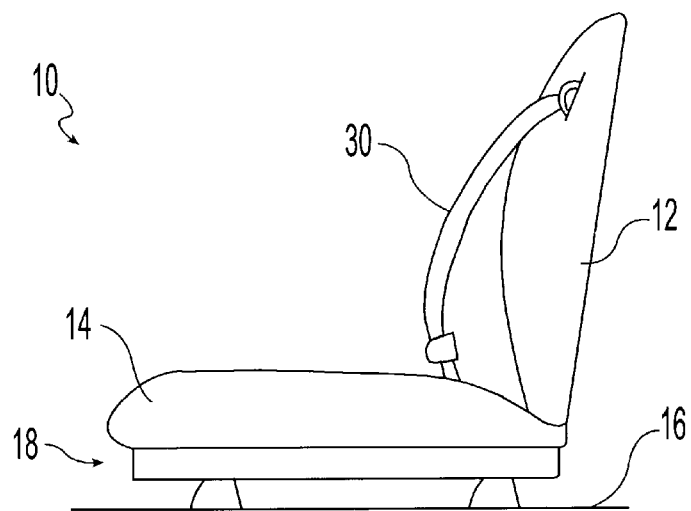
FIG. 1 is a side schematic view of a seat assembly mounted to a vehicle structure.

FIG. 1 illustrates a vehicle seat assembly 10 with a seat back 12 supported for movement relative to a seat bottom 14. The seat assembly 10 is mounted to a vehicle structure 16, such as a vehicle floor, by a mounting assembly, shown generally at 18. The mounting assembly 18 is preferably used on a seat 10 that has a seat belt assembly 30 solely supported by the seat 10, as shown in FIG. 1. This means that when a seat occupant is belted into the seat 10 the seat will be subject to a higher seat load than if the seat belt assembly 30 were supported by a vehicle structure. When the seat occupant experiences a deceleration the seat 10 experiences a seat load that is ultimately transferred to the mounting assembly 18.

Figure 2:
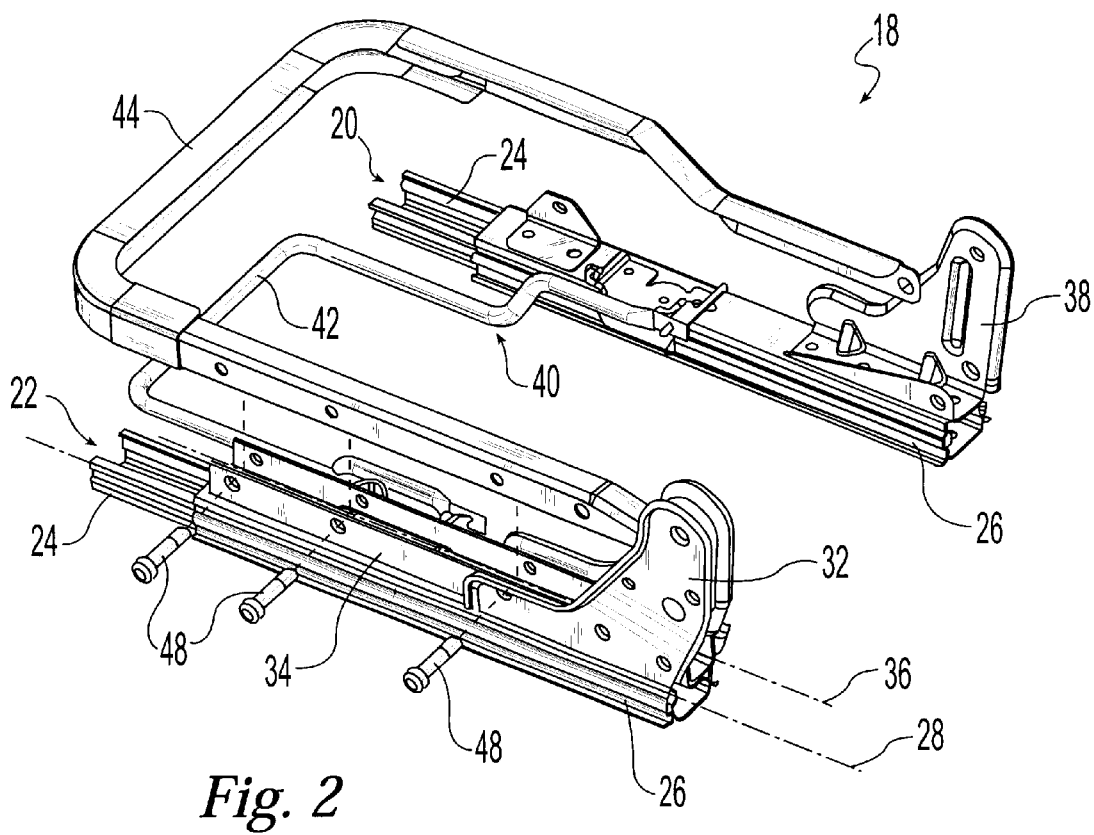
FIG. 2 is an exploded view of a one embodiment of a seat mounting assembly.

The mounting assembly 18 is shown in greater detail in FIG. 2. The mounting assembly 18 includes track assemblies on an inboard side 20 and an outboard side 22 of the seat assembly 10. The terms inboard and outboard are used in this description for clarity and illustration purposes only and cannot be considered limiting. Both the inboard 20 and outboard 22 sides of the mounting assembly 18 include a first track 24 and a second track 26. The first track 24 is preferably a lower track 24 that is fixedly mounted to the vehicle structure 16 such as a vehicle floor or vehicle frame member, for example. The second track 26 is an upper track 26 and is received over the lower track 24 so that the upper track 26 can be moved in a forward or rearward direction relative to the lower track 24. The terms forward, rearward, upper, and lower, as used in this description, are for illustration purposes only and cannot be considered limiting. The profiles of the lower track 24 and the upper track 26 ensure that the upper track 26 only moves along a longitudinal axis 28 of the tracks 24, 26 and does not move in other directions.

The outboard side 22 of the mounting assembly 18 includes at least one seat bracket 32 that is supported on the second track 26 for movement therewith. A reinforcement member 34 is fixed to the bracket 32 and defines a second longitudinal axis 36 that is parallel to the first longitudinal axis 28. The reinforcement member 34 distributes the seat load applied via the bracket 32 along the length of the second track 26. This load distribution along the entire track length prevents the seat tracks 24, 26 from buckling and/or prevents the seat assembly from separating from the vehicle during a sudden deceleration. The reinforcement member 34 is preferably made from a 70 ksi steel, however other grades of steel, or other materials known in the art, such as aluminum, could also be used.

The inboard side 20 of the mounting assembly 18 includes a seat bracket 38. The seat bracket 38 for the inboard side 20 is preferably smaller and more compact than the seat bracket 32 of the outboard side 22 because the outboard seat bracket 32 is designed to receive the reinforcement member 34. While the mounting assembly 18 preferably supports the reinforcement member 34 on the second track 26 of the outboard side 22, the reinforcement member 34 could also be supported on the inboard side 20. Optionally, a pair of reinforcement members 34 could be used, one on the outboard side 22 and one on the inboard side 20, instead of using a single reinforcement member 34. In this configuration the seat bracket 38 on the inboard side 20 would be similar to the seat bracket 32 of the outboard side 22.

Also the mounting assembly 18 with the reinforcement member 34 preferably includes a mechanical adjuster arrangement, shown generally at 40, to position the seat assembly 10 in a position desired by a seat occupant. A towel bar or other type of handle 42 is manually actuated to unlock the seat tracks to allow longitudinal adjustment of the seat 10. However, the mounting assembly 18 could also be used with a seat adjuster arrangement that uses electric motors. A seat pan or seat bottom frame member 44 is attached to the reinforcement member 34. The seat pan 44 is also attached to the seat bracket 32. The seat pan 44 and the reinforcement member 34 preferably work together to distribute the seat load along the first 24 and second 26 tracks. This will be discussed in greater detail below.

Figure 3:
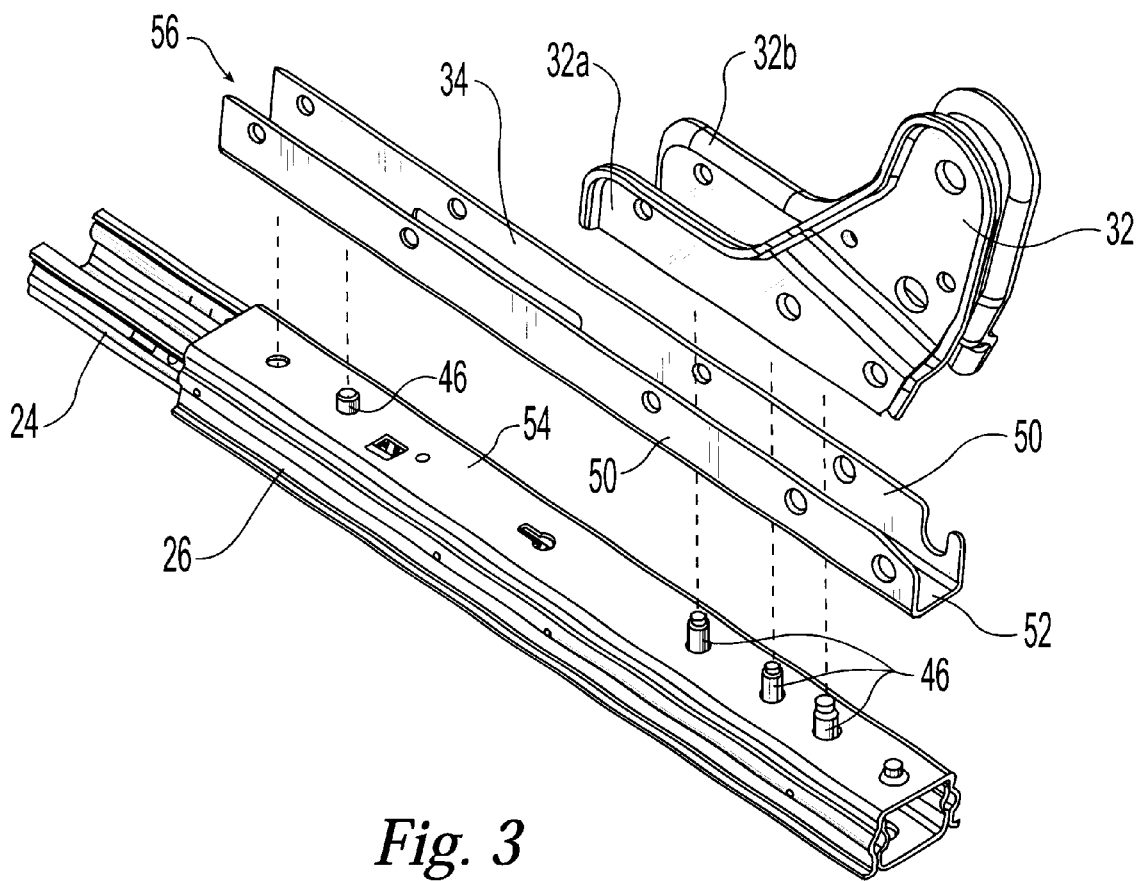
FIG. 3 is a magnified exploded view of the track, bracket, and reinforcement member shown in FIG. 2.
Figure 5:
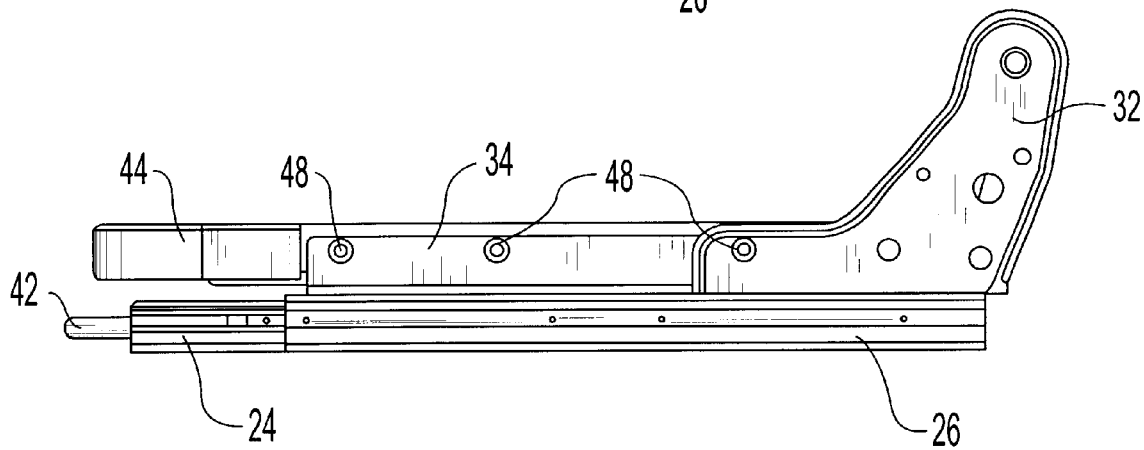
FIG. 5 is a side view of the seat mounting assembly shown in FIG. 4.

FIGS. 3 and 5 show views of the outboard side 22 of the mounting assembly 18. The following description will be directed toward the outboard side 22 of the mounting assembly 18 with the understanding that the inboard side 20 preferably does not have the reinforcement member 34. However, it should be understood, as discussed above that the reinforcement member 34 could be placed on the inboard side 20 or a pair of reinforcement members 34 could be used in the mounting assembly 18. Using only one reinforcement member 34 is preferred because it provides the necessary structural strength for the seat assembly 10 without having the extra weight of two (2) reinforcement members 34.

FIG. 3 shows an exploded view of the bracket 32, tracks 24, 26, and reinforcement member 34. In this embodiment the reinforcement member 34 is preferably directly attached to the second track 26 with a plurality of fasteners 46. The fasteners 46 are preferably vertically oriented with respect to the tracks 24, 26 with a portion of the fasteners 46 extending upwardly beyond the second track 26. The fasteners 46 are inserted through a bottom surface of the reinforcement member 34 and are fastened to securely hold the reinforcement 34 to the second track 26. The fasteners 46 can be rivets, bolts, screws, or any other type of fastener known in the art. While fastening is preferred, other joining methods known in the art could also be used to attach the reinforcement member 34 to the second track 26, such as welding, for example.

The bracket 32 is preferably made from a pair of bracket portions 32a, 32b that are mounted on opposing sides of the tracks 24, 26. The reinforcement member 34 is mounted between the bracket portions 32a, 32b. While two (2) bracket portions 32a, 32b are preferred, the bracket 32 could also be formed as a single piece.

Figure 4:
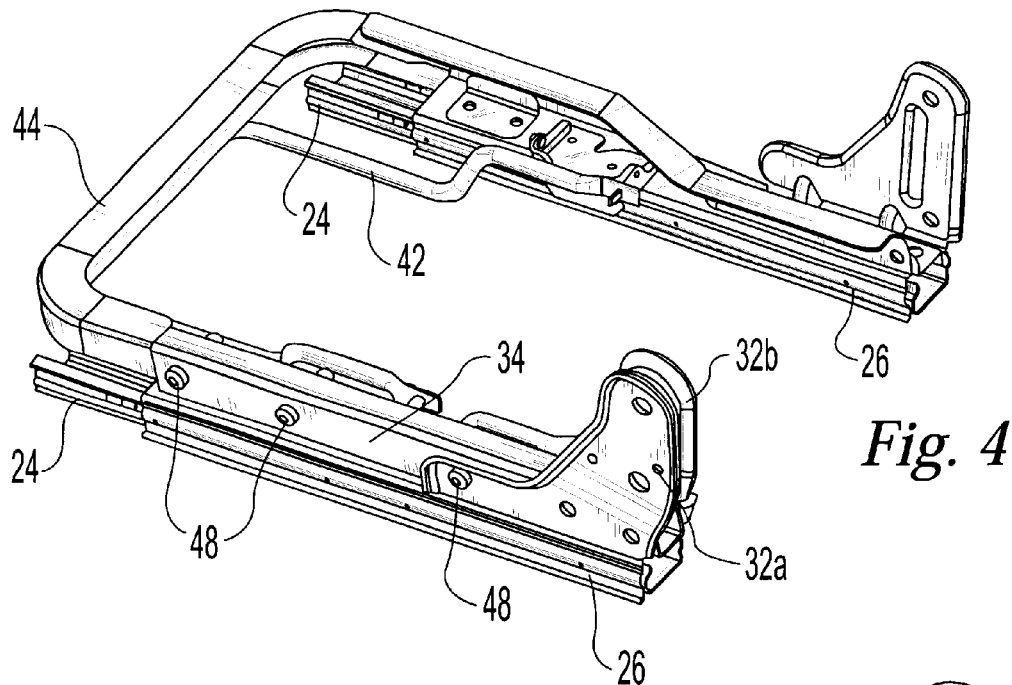
FIG. 4 is an assembled view of the seat mounting assembly shown in FIG. 2.

As shown in FIG. 4, the seat pan 44 fits inside of the reinforcement member 34 and is fastened to the reinforcement member 34 with a plurality of fasteners 48. The fasteners 48 are preferably horizontally orientated with respect to the seat tracks 24, 26 and are installed through the sides of the reinforcement member 34 to secure the seat pan 44 to the reinforcement member. At least one of the fasteners 48 is also used to secure the bracket 32 to the reinforcement member 34. The fasteners 48 are preferably bolts or rivets, however, other fasteners or other joining techniques known in the art could also be used.

As seen in FIG. 5, the installation of the seat pan 44 within the reinforcement member 34 forms a compact mounting assembly 18 that is strong enough to support an "all belts to seat load." As seen more clearly in FIG. 3, the reinforcement member 34 is comprised of a channel 34 having a pair of side walls 50 interconnected by a base 52. The channel 34 is preferably U-shaped with the base 52 extending along a top surface 54 of the second track 26 with the side walls 50 being generally perpendicular to the base 52 and extending upwardly away from the first 24 and second 26 tracks. This forms a pocket 56 defined by the base 52 and the side walls 50 that receives the seat pan 44 to form the compact assembly 18. While a U-shaped channel 34 is preferred, it should be understood that other cross-sectional shapes could also be used, such as a C-shape or a square or round tube, for example.

As discussed above, the channel 34 and the seat pan 44 are rigidly fixed to the second track 26 for movement therewith and the bracket 32 is attached to the channel 34 with at least one of the fasteners 48. The channel 34 acts in conjunction with the seat pan 44 to transfer the seat load and stiffen the second track 26. One advantage with this embodiment is that the channel 34 does not have to be as strong as would be required if the channel 34 was not combined with the seat pan 44.

Figure 6:
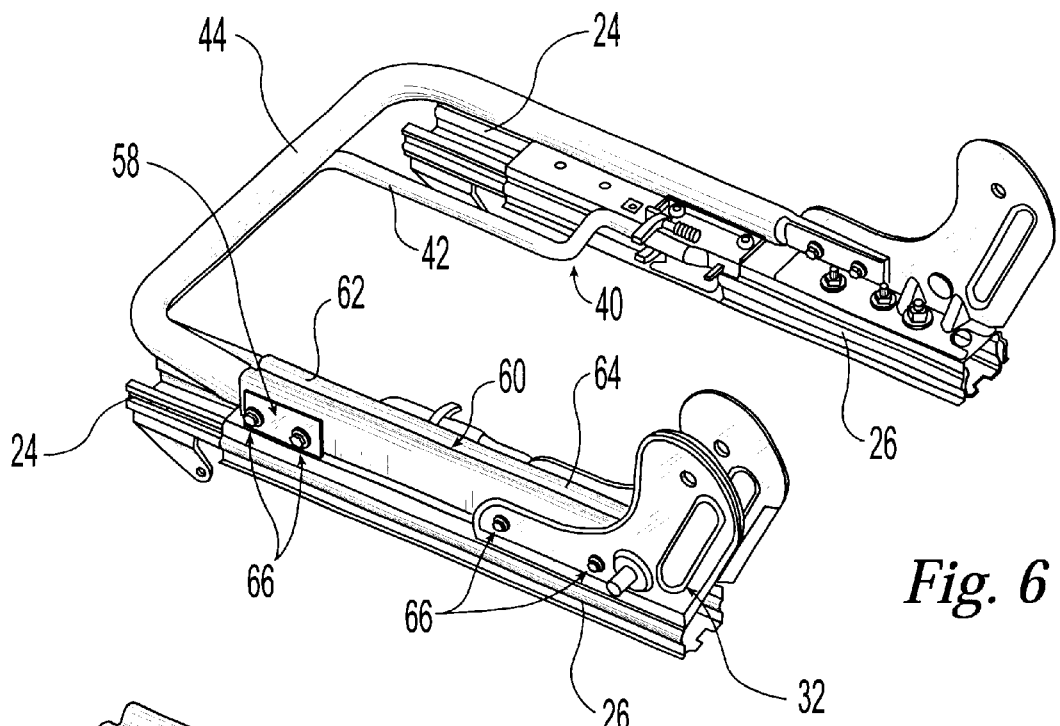
FIG. 6 is an assembled view of an alternate embodiment of the seat mounting assembly.

An alternate embodiment of the invention is shown in FIG. 6. This configuration includes a second seat bracket 58 in addition to the first seat bracket 32. The first seat bracket 32 is preferably a rear pivot bracket 32 that is attached to a rear portion of the second track 26. The second seat bracket 58 is preferably a front track bracket 58 attached to a front portion of the second track 26. The front track 58 and rear pivot 32 brackets are attached to the second track 26 with rigid connections so that the brackets 32, 58 move with the second track 26.

A reinforcement member 60 is supported by the front track 58 and rear pivot 32 brackets. The reinforcement member 60 extends along the length of the second track 26 and has one end 62 fixed to the front track bracket 58 and an opposite end 64 fixed to the rear pivot bracket 32. The reinforcement member 60 is held apart from the second track 26 and is rigidly connected to the brackets 32, 58 by fasteners 66 for movement with the second track 26.

Figure 7:
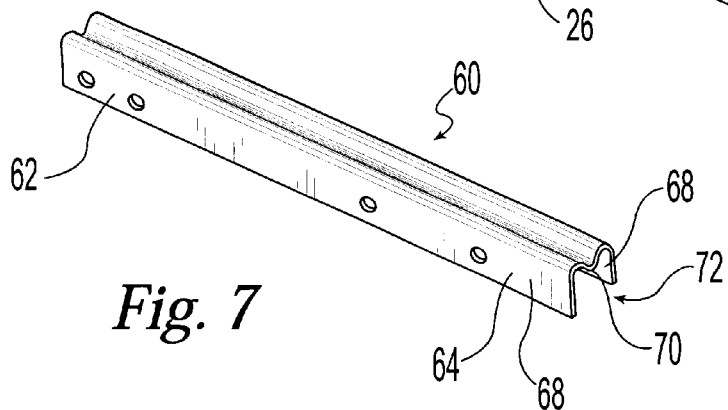
FIG. 7 is a perspective view of the reinforcement member of FIG. 6.

As shown in FIG. 7, the reinforcement member 60 is comprised of a channel 60 having a pair of side walls 68 interconnected by a base 70. The channel is preferably U-shaped with the base 70 being spaced apart from the top surface 54 of the second track 26 with the side walls 68 being perpendicular to the base 70 and extending downwardly toward the first 24 and second 26 tracks to form a pocket 72. The pocket 72 is defined by the base 70, the side walls 68, and the top surface of the second track 54 and the seat pan 44 is partially received within the pocket 72. The seat pan 44 is attached to the front track bracket 58 and the channel 60.

Figure 8:
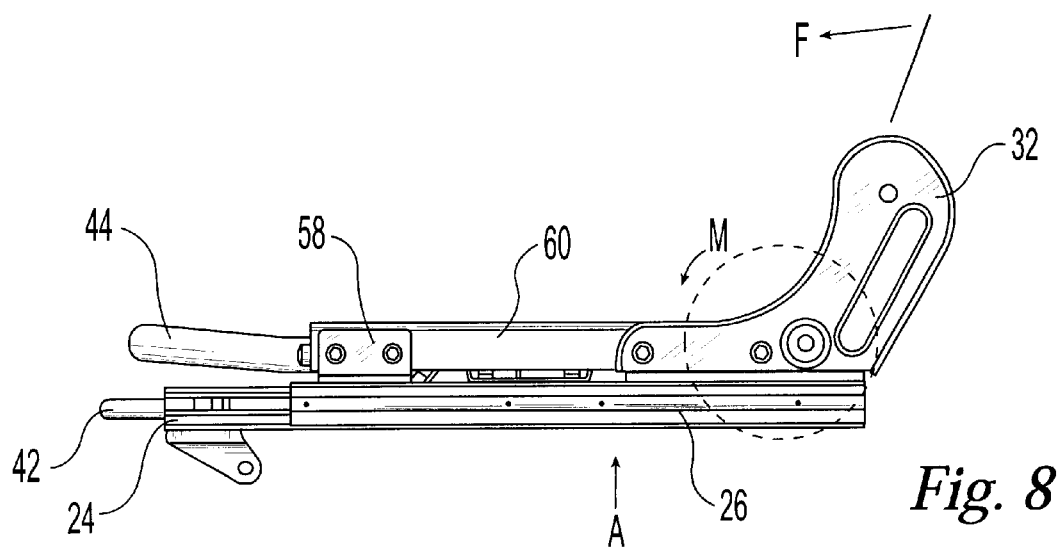
FIG. 8 is a side view of the seat mounting assembly shown in FIG. 6.

When a seat load, indicated by arrow "F" in FIG. 8, is applied to the rear pivot bracket 32 a bending moment, indicated by the circular arrow "M" is created. Without the reinforcement member 60 the tracks 24, 26 would buckle at a point along the tracks 24, 26 indicated at "A." The addition of the reinforcement member 60 to the mounting assembly 18 results in a distribution of the seat load along the length of the tracks 24, 26 and prevents buckling.

The subject invention offers several advantages over prior art "all belts to seat" mounting assemblies because it provides a durable and robust mounting assembly that reduces the overall number of parts, reduces weight and overall assembly cost. The reinforcement member 34, 60 is designed to receive and distribute seat loads along the entire length of the tracks 24, 26, thus preventing track buckling. The reinforcement member 34, 60 also more evenly distributes the seat load along the tracks 24, 26 so that likelihood of track separation from the vehicle due to overloading a single portion of the track is reduced. The mounting assembly 18 is also designed to provide adequate structural strength when the seat is in the forward or rearward position and when the seat back is in the upright or recliner position. The unique design also provides a lower packaging height to allow increased occupant space and improved flip and fold capabilities.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An assembly for mounting a seat within a vehicle comprising:
   a first track defining a first longitudinal axis;
   a second track supported for movement relative to said first track along said first longitudinal axis;
   at least one bracket supported on said second track for movement therewith;
   a reinforcement member fixed to said bracket and defining a second longitudinal axis that is parallel to said first longitudinal axis, said reinforcement member for distributing a seat load applied to said bracket along the length of said second track;
   a seat frame member rigidly attached to said at least one bracket; and
   wherein said seat frame member is rigidly attached to said reinforcement member.

2. The assembly as recited in claim 1 wherein said reinforcement member is fixed to said second track with a plurality of fasteners.

3. The assembly as recited in claim 1 wherein said reinforcement member is comprised of a channel having a pair of side walls interconnected by a base.

4. The assembly as recited in claim 1 wherein said at least one bracket is comprised of a front track bracket rigidly connected to a first end of said second track and a rear pivot bracket rigidly connected to a second end of said second track.

5. The assembly as recited in claim 1 wherein said at least one bracket includes a rear pivot bracket rigidly connected to said second track.

6. An assembly for mounting a seat within a vehicle comprising:
   a first track defining a first longitudinal axis;
   a second track supported for movement relative to said first track along said first longitudinal axis;
   at least one bracket supported on said second track for movement therewith;
   a reinforcement member fixed to said bracket and defining a second longitudinal axis that is parallel to said first longitudinal axis, said reinforcement member for distributing a seat load applied to said bracket along the length of said second track;
   a seat frame member rigidly attached to said at least one bracket;
   wherein said reinforcement member is comprised of a channel having a pair of side walls interconnected by a base; and
   wherein said channel is U-shaped with said base extending along a top surface of said second track with said side walls being perpendicular to said base and extending upwardly away from said first and second tracks.

7. An assembly for mounting a seat within a vehicle comprising:
   a first track defining a first longitudinal axis;
   a second track supported for movement relative to said first track along said first longitudinal axis;
   at least one bracket supported on said second track for movement therewith;
   a reinforcement member fixed to said bracket and defining a second longitudinal axis that is parallel to said first longitudinal axis;
   a seat frame member rigidly attached to said reinforcement member, said seat frame member and said reinforcement member for distributing a seat load applied to said bracket along the length of said second track;
   wherein said reinforcement member is comprised of a channel having a pair of side walls interconnected by a base; and
   wherein said channel is U-shaped with said base extending along a top surface of said second track with said side walls being perpendicular to said base and extending upwardly away from said first and second tracks to form a pocket defined by said side walls and said base for receiving said seat frame member.

8. An assembly for mounting a seat within a vehicle comprising:
   a first track defining a first longitudinal axis;
   a second track supported for movement relative to said first track along said first longitudinal axis;
   at least one bracket supported on said second track for movement therewith;
   a reinforcement member fixed to said bracket and defining a second longitudinal axis that is parallel to said first longitudinal axis;
   a seat frame member rigidly attached to said reinforcement member, said seat frame member and said reinforcement member for distributing a seat load applied to said bracket along the length of said second track;
   wherein said reinforcement member is comprised of a channel having a pair of side walls interconnected by a base; and
   wherein said channel is U-shaped with said base being spaced apart from a top surface of said second track with said side walls being perpendicular to said base and extending downwardly toward said first and second tracks to form a pocket defined by said base, said side walls, and said top surface of said second track for receiving said seat frame member.

9. An assembly for mounting a seat within a vehicle comprising:

a first track defining a first longitudinal axis;

a second track supported for movement relative to said first track along said first longitudinal axis;

at least one bracket supported on said second track for movement therewith;

a reinforcement member fixed to said bracket and defining a second longitudinal axis that is parallel to said first longitudinal axis, said reinforcement member for distributing a seat load applied to said bracket along the length of said second track;

a seat frame member rigidly attached to said at least one bracket; and wherein said reinforcement member extends along substantially the entire length of said second track.

10. The assembly for mounting a seat within a vehicle comprising:

a first track defining a first longitudinal axis;

a second track supported for movement relative to said first track along said first longitudinal axis;

at least one bracket supported on said second track for movement therewith;

a reinforcement member fixed to said bracket and defining a second longitudinal axis that is parallel to said first longitudinal axis, said reinforcement member for distributing a seat load applied to said bracket along the length of said second track;

wherein said reinforcement member is comprised of a channel having a pair of side walls interconnected by a base;

wherein said channel is U-shaped with said base extending along a top surface of said track with said side walls being perpendicular to said base and extending upwardly away from said first and second tracks; and a seat frame member fastened to said bracket and received in pocket formed between said pair of side walls of said reinforcement member.

11. The assembly as recited in claim 10 wherein said channel and said seat frame member are rigidly fixed to said second track for movement therewith.

12. The assembly as recited in claim 11 wherein said bracket is attached to said channel with a plurality of fasteners.

13. The assembly for mounting a seat within a vehicle comprising:

a first track defining a first longitudinal axis;

a second track supported for movement relative to said first track along said first longitudinal axis;

at least one bracket supported on said second track for movement therewith;

a reinforcement member fixed to said bracket and defining a second longitudinal axis that is parallel to said first longitudinal axis, said reinforcement member for distributing a seat load applied to said bracket along the length of said second track;

wherein said at least one bracket is comprised of a front track bracket rigidly connected to a first end of said second track and a rear pivot bracket rigidly connected to a second end of said second track; and wherein said reinforcement member extends along the length of the second track and has one end fixed to said front track bracket and an opposite end fixed to said rear pivot bracket.

14. The assembly as recited in claim 13 wherein said reinforcement member is comprised of a channel having a pair of side walls interconnected by a base.

15. The assembly as recited in claim 14 wherein said channel is U-shaped with said base being spaced apart from a top surface of said second track with said side walls being perpendicular to said base and extending downwardly toward said first and second tracks to form a pocket defined by said base, said leg, and said top surface of said second track.

16. The assembly as recited in claim 15 including a seat frame member that is partially received within said pocket and is attached to said front track bracket and said channel.

* * * * *